United States Patent
Xiong et al.

(10) Patent No.: US 10,006,102 B2
(45) Date of Patent: Jun. 26, 2018

(54) MONAZITE AND APATITE PARAGENETIC ORE ENRICHMENT METHOD

(71) Applicant: INSTITUTE OF MULTIPURPOSE UTILIZATION OF MINERAL RESOURCES, Chengdu, Sichuan (CN)

(72) Inventors: Wenliang Xiong, Sichuan (CN); Yaohui Yang, Sichuan (CN); Shuping Liu, Sichuan (CN); Chengqing Ji, Sichuan (CN); Xiaobo Zeng, Sichuan (CN); Jie Deng, Sichuan (CN); Xiangwen Liao, Sichuan (CN); Bingyan Chen, Sichuan (CN); Shanzhi Deng, Sichuan (CN)

(73) Assignee: INSTITUTE OF MULTIPURPOSE UTILIZATION OF MINERAL RESOURCES, Sichuan (CN)

( * ) Notice: Subject to any disclaimer, the term of this patent is extended or adjusted under 35 U.S.C. 154(b) by 56 days.

(21) Appl. No.: 15/104,963

(22) PCT Filed: Jan. 8, 2015

(86) PCT No.: PCT/CN2015/070367
§ 371 (c)(1),
(2) Date: Jun. 15, 2016

(87) PCT Pub. No.: WO2016/109966
PCT Pub. Date: Jul. 14, 2016

(65) Prior Publication Data
US 2016/0376683 A1    Dec. 29, 2016

(51) Int. Cl.
| | |
|---|---|
| C22B 59/00 | (2006.01) |
| C01B 25/45 | (2006.01) |
| C01B 25/455 | (2006.01) |
| C22B 1/24 | (2006.01) |
| C22B 3/06 | (2006.01) |
| C22B 3/10 | (2006.01) |
| C22B 3/22 | (2006.01) |
| C22B 3/24 | (2006.01) |
| C22B 1/00 | (2006.01) |

(52) U.S. Cl.
CPC ............. *C22B 59/00* (2013.01); *C01B 25/45* (2013.01); *C01B 25/455* (2013.01); *C22B 1/00* (2013.01); *C22B 1/24* (2013.01); *C22B 3/06* (2013.01); *C22B 3/065* (2013.01); *C22B 3/10* (2013.01); *C22B 3/22* (2013.01); *C22B 3/24* (2013.01); *Y02P 10/234* (2015.11)

(58) Field of Classification Search
CPC .. C22B 59/00; C22B 3/06; C22B 3/08; C22B 3/065; C22B 3/10; C22B 3/22; Y02P 10/234
USPC ........................................................ 423/21.1
See application file for complete search history.

(56) References Cited

U.S. PATENT DOCUMENTS

| | | | |
|---|---|---|---|
| 2,310,738 A | 9/1952 | Cuthbertson et al. | ........ 209/167 |
| 2009/0272230 A1* | 11/2009 | Mackowski | .............. C22B 1/11 75/739 |

FOREIGN PATENT DOCUMENTS

| | | | |
|---|---|---|---|
| CA | 2025152 A1 | | 3/1991 |
| CA | 2631190 | * | 11/2009 |
| CN | 1721559 A | | 1/2006 |
| CN | 101768674 A | | 7/2010 |
| CN | 102614978 A | | 8/2012 |
| CN | 102796888 A | | 11/2012 |
| GB | 1334223 | * | 10/1973 |
| WO | WO 91/16986 | | 11/1991 |

OTHER PUBLICATIONS

Chinese International Search Report of corresponding International PCT Application No. PCT/CN2015/070367, dated Oct. 29, 2015.

* cited by examiner

*Primary Examiner* — Steven J Bos
(74) *Attorney, Agent, or Firm* — J.C. Patents

(57) ABSTRACT

The present invention discloses a monazite and apatite paragenetic ore enrichment method. High-grade and high-recovery-rate monazite concentrate can be obtained by adopting the method through steps of ore grinding, floatation, magnetic separation and low-acid advanced leaching treatment and re-floatation. In this process, the applicable range of ore pulp temperature is wide, the process flow is short, the ore dressing conditions are mild, the energy consumption is small, the used diluted acid can be cyclically regenerated and used, the pollution is small, the environmental stress is small and the recovery rate of low-grade monazite and apatite paragenetic ores can be obviously improved.

32 Claims, 1 Drawing Sheet

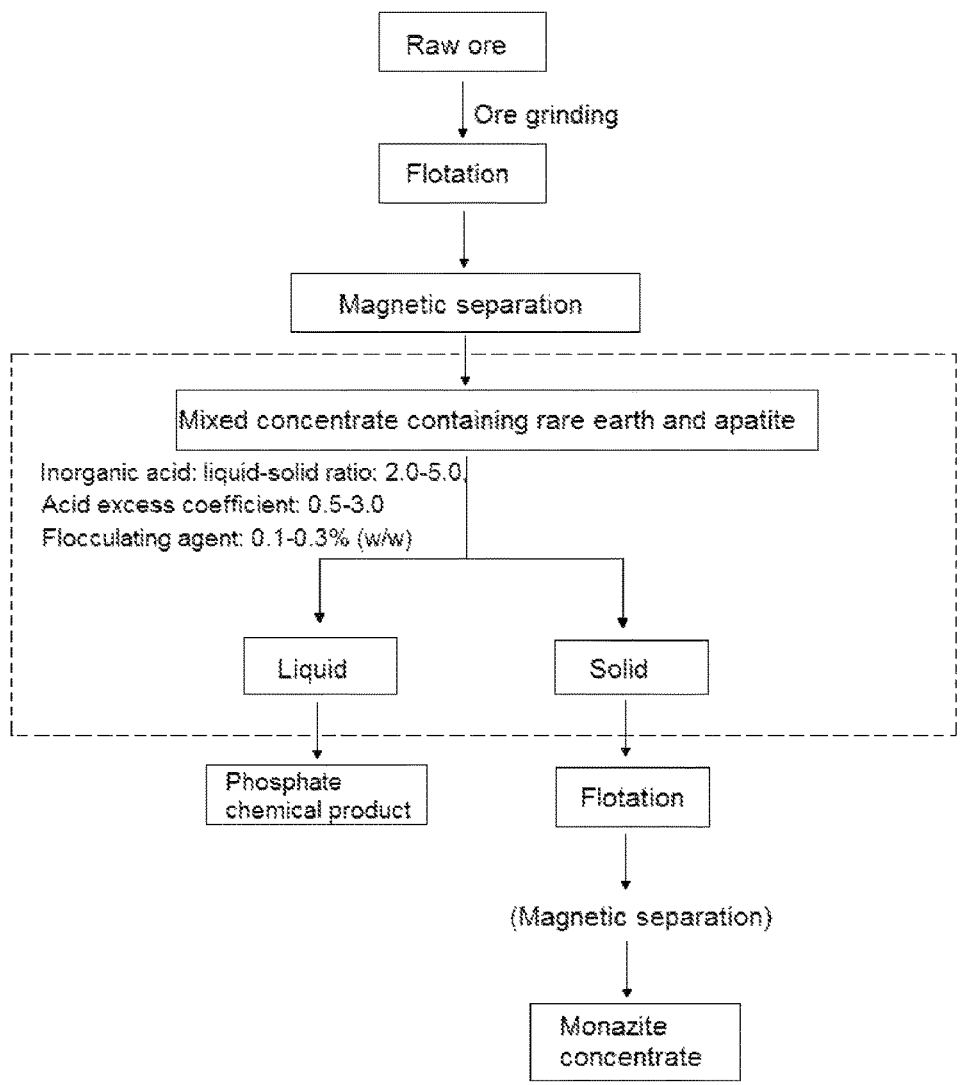

MONAZITE AND APATITE PARAGENETIC ORE ENRICHMENT METHOD

CROSS-REFERENCE TO RELATED APPLICATION

This application is a national phase application of international application No. PCT/CN2015/070367 filed on Jan. 8, 2015. The contents of this prior application is hereby incorporated by reference in its entirety.

FIELD OF THE INVENTION

The present invention relates to the technical field of monazite paragenetic ore treatment, in particular to a monazite and apatite paragenetic ore enrichment method. The present invention is widely applied to enrichment of various monazite paragenetic ores to obtain high-quality monazite and apatite concentrate products.

BACKGROUND OF THE INVENTION

In recent years, due to the development of science and technology, the demand for rare earth becomes increasingly greater, and the dependence of fields such as high-intensity permanent magnets, electronic display fluorescence powder, renewable energy techniques and alloy industry on rare earth becomes increasingly stronger. How to guarantee the stable supply of rare earth has already become a great challenge to the current society.

Among more than 250 known rare earth ores, monazite is one of three major rare earth ores which are commercially mined, is also a second important phosphate rare earth ore in the world, and is mainly distributed in Australia, United States, Africa, Bayan Obo of China, etc. The content of rare earth oxide in monazite is about 70%. Different from bastnaesite, monazite further contains 4-12% of thorium and a small amount of uranium.

At present, commonly used rare earth ore enrichment methods mainly include gravity separation, magnetic separation, electrostatic separation and flotation. Monazite can exist in the form of seaside sand stone or vein-like ore. Gravity separation and magnetic separation can be utilized for enrichment aiming at monazite in the form of seaside sand stone. CN102614978 reports a gravity separation and magnetic separation combined method for respectively enriching ilmenite, monazite and zirconite from the seaside sand ore. A commonly used method for the vein-like ore is flotation. U.S. Pat. No. 2,610,738 reports a comparatively typical flotation method. WO1991016986 improves the flotation agent and the flotation method, such that the flotation effect of monazite is greatly improved. However, monazite can also be paragenetic with apatite, which mainly exists in Australia, United States and Russia. Apatite is mainly used for preparing fertilizer and can also be used for extracting some rare earth metals.

At present, there are few of researches aiming at monazite and apatite paragenetic ore enrichment methods. The traditional enrichment methods not only are poor in effect and complex in process, but also easily cause environmental pollution. Therefore, it becomes a problem which needs to be urgently solved to find an effective method for respectively enriching monazite and apatite from monazite and apatite paragenetic ores.

SUMMARY OF THE INVENTION

The purpose of the present invention is to provide a monazite and apatite paragenetic ore enrichment method aiming at the defect of the prior art. By adopting the method, low-grade monazite ores can be separated and enriched from monazite and apatite paragenetic ores to obtain high-grade monazite concentrate with content of REO which is greater than 55%, and phosphate concentrate can also be obtained at the same time.

The technical purpose of the present invention is realized through the following solutions:

The monazite and apatite paragenetic ore enrichment method comprises the following steps: performing acid leaching to mixed concentrate containing rare earth and apatite by using inorganic acid and then performing liquid-solid separation to obtain acid leaching residues and leaching solution, wherein the acid leaching residues are monazite and apatite paragenetic ores; and a liquid-solid ratio of the inorganic acid to the mixed concentrate is 2.0-5.0, an acid excess coefficient is 0.5-3.0, and 0.1-0.3% of flocculating agent by mass percentage based on a mass sum of the mixed concentrate and the inorganic acid is added during acid leaching.

In the present invention, the acid excess coefficient is a ratio of actual acid dose to theoretical acid dose, and the liquid-solid ratio of the inorganic acid to the mixed concentrate is a mass ratio of the inorganic acid to the mixed concentrate.

In the present invention, the content of REO in the mixed concentrate is generally 3% and greater than 3%, the content of $P_2O_5$ therein is greater than 36%, and by performing acid leaching treatment to the mixed concentrate, apatite can be dissolved out to obtain the acid leaching solution and the acid leaching residues under the situation of not jeopardizing monazite ore bodies. This process is to leach and separate out acid-soluble ores such as calcium and phosphorus in apatite from the mixed concentrate by destroying calcium-containing ores at low acidity according to acid solubility difference of ores, such that apatite is preferentially dissolved out under the situation of not destroying the crystal structure of monazite. In the dissolving-out process, rare earth which is isomorphous with apatite also enters the leaching solution.

The liquid-solid ratio of the inorganic acid to the mixed concentrate and the acid excess coefficient need to be adjusted according to the molar weight of effectively components in the mixed concentrate.

Generally, in the field of rare earth ore dressing or metallurgy, acid leaching is often used for leaching rare earth metals. The prior art does not use acid leaching to the dressing of ores, especially the dressing of paragenetic rare earth ores. With respect to the dressing of paragenetic ores, it is of importance that various ores in the paragenetic ores can be respectively separated or a certain ore therein can be separated on the premise that various ores can be simultaneously and effectively separated without jeopardizing the bodies of various ores and influencing the dressing grades of various ores or at least influencing the body of a certain ore therein and influencing the dressing grade of the ore. However, it is difficult to satisfy this premise in the aspect of dressing of paragenetic ores. Especially in the aspect of dressing of monazite and apatite paragenetic ores, this premise has not been satisfied by the prior art. In the present invention, by using acid leaching and more importantly controlling process parameters in the acid leaching process, the effect of respectively enriching monazite and apatite in the monazite and apatite paragenetic ores is realized, the ore bodies of the two ores are not jeopardized and the obtaining of high-grade ores of the two ores is not influenced.

In the present invention, the liquid-solid ratio, the acid excess coefficient and the dose of the flocculating agent are critically important to whether the monazite and apatite paragenetic ores can be effectively enriched or not. Too much acid may cause that part of monazite enters the leaching solution, the subsequent dressing effect of monazite is poor and it is difficult to obtain high-grade concentrate. Too little acid may cause that not only is it difficult to effectively leach apatite, but also calcium components on the surface of monazite ores cannot be more favorably dissolved out and it is not beneficial to the subsequent dressing effect of monazite. In addition, the conventional effect of the flocculating agent is to precipitate substances. In the present invention, the selection and dose of the flocculating agent also play an important role in the time of contact between the acid and the ore bodies. If the precipitation effect is not good, the time of action between the acid and the ore bodies is increased, and thereby not only may the situation that monazite enters the leaching solution, but also the ore bodies may be destroyed due to long-time acid leaching. The contributions made by the present invention to the prior art are reflected in that the effective separation of monazite and apatite is realized by controlling the liquid-solid ratio, the acid excess coefficient and the dose of the flocculating agent, the two ores can be effectively enriched, and not only can the problem that the two ores are difficult to separate be solved, but also further dressing can be performed to the two ores on this basis to obtain high-grade concentrate.

It needs to be pointed out that the present invention is particularly suitable for the enrichment of low-grade monazite and apatite paragenetic ores, more importantly the method provided by the present invention is not limited to the enrichment of the low-grade monazite and apatite paragenetic ores but is suitable for the enrichment of monazite and apatite paragenetic ores of any grade, and the enriching effect of the low-grade monazite and apatite paragenetic ores is the most remarkable.

The acid leaching solution can replace the inorganic acid to treat monazite and apatite.

The main components of the acid leaching solution are soluble ions of calcium, rare earth, iron, radium, uranium and the like, and products such as halide salt, rare earth, iron compound, radium salt and uranium residues can be obtained through impurity removal, purification and refinement. Remaining solution obtained after purification and refinement can be used for regenerating inorganic acid by adopting a sulfuric acid precipitation method. The acid leaching residues are monazite and apatite paragenetic ores with about 10-30% content of REO. The operation recovery rate of this step is generally 80%. A reaction process of the mixed concentrate and the inorganic acid is as follow:

By taking hydrochloric acid as an example, during chemical ore processing of the mixed concentrate, the following reactions are included:

$$Ca_5(PO_4)_3F + 10HCl = 5CaCl_2 + 3H_3PO_4 + HF$$

$$CaCO_3 + 2HCl = CaCl_2 + H_2O + CO_2\uparrow$$

$$CaF_2 + 2HCl = CaCl_2 + 2HF$$

After the acid leaching treatment, the grades of monazite and apatite in the acid leaching residues are improved. If flotation is performed again to the acid leaching residues, since the flotation agent can fully interact with monazite ores after the acid leaching process, generally monazite concentrate with greater than 55% content of REO can be obtained. Therefore, the recovery rate of the monazite ores reaches more than 85%.

The flocculating agent is polyacrylamide and/or gelatin.

Preferably, the flocculating agent is polyacrylamide and gelatin, and a mass ratio of the polyacrylamide to the gelatin is 2:1.

Preferably, the mixed concentrate is a solid matter obtained by performing ore grinding to raw ores and then performing primary flotation and/or magnetic separation. Concentrate obtained by flotation, magnetic separation or flotation in combination with magnetic flotation is the most suitable for being subjected to the acid leaching treatment in the present invention.

The acid is one of HCl, HBr, HI, $HNO_3$ and $H_3PO_4$, preferably HCl, $H_3PO_4$ or mixture of HCl and $H_3PO_4$. A volume ratio of HCl to $H_3PO_4$ is 2:1 when the inorganic acid is mixture of HCl and $H_3PO_4$. A dose of the acid is to be determined according to content of Ca in the calcium-containing ores. Through leaching by using the inorganic acid, calcium salt in apatite forms soluble ions which enter the leaching solution, such that the goal of reducing the grade of Ca in the mixed concentrate is achieved.

Preferably, liquid temperature of a reaction system during acid leaching is not lower than 20° C. and 0.1-0.3% of flocculating agent by mass percentage is added. The lower the temperature is, the longer the reaction time is and the production cost is correspondingly increased. At acid leaching temperature of no lower than 20° C., the reaction time and the production cost can be optimized.

Preferably, a mass ratio of water to solid substances in ore pulp is (2-3):5 during the primary flotation.

Preferably, magnetic field intensity during the magnetic separation is 5000-12000 Oe.

Preferably, the ore pulp is obtained during the primary flotation through a method which comprises the following steps: grinding the raw ores into ones wherein the weight of particles with a particle size of <0.074 mm is not lower than 60% of total weight of the raw ores, and adding water for pulp mixing.

Preferably, the primary flotation comprises primary roughing and primary cleaning and a pH value of the ore pulp during the primary flotation is a natural pH value.

Preferably, the primary roughing is flotation by adding flotation agent I into the ore pulp, the flotation agent I comprises an inhibitor and a collector, and the collector is at least one of sodium aliphatate and oxidized paraffin wax soap.

Preferably, a dose of the collector in the flotation agent I is 200-500 g/t·raw ore.

Preferably, a dose of the inhibitor in the flotation agent I is 500-2000 g/t·raw ore.

Preferably, the inhibitor is water-soluble silicate or water-soluble fluosilicate.

Preferably, the cleaning is blank cleaning without adding any agent and blank cleaning facilitates the improvement of the grade of the mixed concentrate.

Preferably, the primary flotation further comprises scavenging, a collector used for the scavenging is at least one of sodium aliphatate and oxidized paraffin wax soap, and a dose of the collector is 100-250 g/t·raw ore; and an inhibitor is water-soluble silicate or water-soluble fluosilicate, and a dose of the inhibitor is 250-1000 g/t·raw ore. Scavenging operation can improve the recovery of the mixed concentrate. In the present invention, the scavenging can be performed after roughing and can also be performed after cleaning.

The collector is at least one of sodium oleate, saturated sodium aliphatate, sodium dodecyl sulfate and oxidized paraffin wax soap, preferably sodium oleate.

Preferably, after acid leaching, the acid leaching residues are taken and added with water for pulp mixing and flotation agent II is added for secondary flotation to obtain monazite concentrate.

Preferably, the flotation agent II comprises an inhibitor and a collector, and the collector is at least one of sodium aliphatate and oxidized paraffin wax soap.

Preferably, the secondary flotation comprises secondary roughing and secondary cleaning; and during the secondary flotation, the mass ratio of water to solid substances in the ore pulp is (3-6):10, the pH value is a natural pH value and the temperature is normal temperature.

The secondary cleaning is blank cleaning without adding any agent and times of cleaning are 2-5.

Preferably, the flotation agent II is added during the secondary roughing, the flotation agent II comprises an inhibitor and a collector, and the collector is at least one of sodium aliphatate and oxidized paraffin wax soap.

Preferably, a dose of the collector in the flotation agent II is 200-500 g/t·raw ore.

The collector in the flotation agent II is at least one of sodium oleate, saturated sodium aliphatate, sodium dodecyl sulfate and oxidized paraffin wax soap, preferably sodium oleate.

Preferably, the inhibitor in the flotation agent II is water-soluble silicate or water-soluble fluosilicate.

Preferably, the inhibitor in the flotation agent II is water glass, sodium silicate and/or sodium fluosilicate, and the dose thereof is 500-2000 g/t·raw ore.

Preferably, the secondary flotation further comprises at least one time of scavenging, the collector used for the scavenging is at least one of sodium aliphatate and oxidized paraffin wax soap, and the dose of the collector is 100-250 g/t·raw ore; and the inhibitor is water-soluble silicate or water-soluble fluosilicate, and a dose of the inhibitor is 250-1000 g/t·raw ore. Scavenging operation can improve the recovery rate of the mixed concentrate.

Preferably, magnetic separation is performed to the obtained monazite concentrate after the secondary flotation and magnetic field intensity during the magnetic separation is 8000-12000 Oe.

The magnetic separation is performed after the secondary flotation is performed, and thereby the grade of the monazite concentrate can be slightly improved. However, in consideration of control of the production cost, the magnetic separation may not be performed and monazite concentrate with an ideal grade can also be obtained.

Preferably, liquid temperature of a reaction system during acid leaching is 20-120° C.

Preferably, the liquid temperature of the reaction system is 40-100° C. and time of acid leaching treatment is 10-600 min. Proper increase of the reaction temperature facilitates inhibiting iron from entering solution.

Preferably, an acid excess coefficient during acid leaching is 0.2-2.0. The acid excess coefficient and the liquid-solid ratio directly influence the particle size and calcium removing effect of acid leached concentrate. When the acid excess coefficient is 0.2-2.0, the optimum control of the acid leached concentrate can be realized.

Preferably, content of REO in the raw ores of the monazite and apatite paragenetic ores is 0.3-10%.

The present invention has the following remarkable advantages:

1. Monazite can be separated and enriched from low-grade monazite and apatite paragenetic ores to obtain high-grade monazite concentrate; content of REO in the obtained monazite concentrate in the present invention is not lower than 55%, and the recovery rate is not lower than 60%.

2. The process flow is simple, the ore dressing conditions are mild, the energy consumption is small, the used diluted acid can be cyclically regenerated and used, the pollution is small and the environmental stress is small.

3. Both monazite and apatite ores belong to phosphate ores, the floatability difference therebetween is very small and it is difficult to obtain high-quality monazite and phosphate concentrate by adopting the conventional ore dressing methods. However, the present invention not only can obtain high-grade monazite concentrate, but also can obtain high-purity phosphate concentrate.

4. Since monazite and apatite are respectively enriched after acid leaching, the ore dressing process of the two ores becomes simple and high-grade concentrate can be obtained without needing more ore dressing agents and steps.

DESCRIPTION OF THE DRAWINGS

FIG. 1 is a process flowchart of a method provided by the invention, wherein the part in a dotted line frame is the treatment step of enrichment of monazite and apatite paragenetic ores performed by using inorganic acid and flocculating agent in the present invention and the step shown by the part in round brackets is an unnecessary step.

DESCRIPTION OF THE EMBODIMENTS

The above-mentioned contents of the present invention will be further described below in detail through embodiments. However, it shall not be understood as that the range of the above-mentioned subject of the present invention is only limited to the following embodiments. Enrichment of monazite and apatite paragenetic ores which is realized based on the above-mentioned contents of the present invention belongs to the range of the present invention.

Embodiment 1

For certain monazite and apatite paragenetic ores originated from United States, with content of REO and $P_2O_5$ in raw ores being respectively 0.45% and 5.0%, 500 g of raw ores were weighed and crushed and ground to 200-mesh ore particles accounting for 75% of the total particles, water was added until a mass ratio of water to solid substances in ore pulp is 2:5, a water glass mixture was added and used as an inhibitor, sodium oleate was added and used as a collector, and a flotation process including one time of roughing, one time of scavenging and four times of cleaning at normal temperature was performed, wherein a dose of the water glass during roughing is 1500 g/t·raw ore, a dose of sodium oleate is 300 g/t·raw ore, the dose of the agent was halved during one time of scavenging, the four times of cleaning are blank cleaning, floated mixed concentrate can be obtained thereby, the content of REO therein is 2.5%, the operation recovery rate of REO is 85%, the content of $P_2O_5$ is 31.2% and the operation recovery rate of $P_2O_5$ is 92.5%. The mixed concentrate was subjected to high-intensity magnetic separation at magnetic field intensity of 10000 Oe, magnetic products, i.e., monazite and apatite mixed concentrate can be obtained thereby, the content of REO therein is 6.5%, the operation recovery rate of REO is 92%, the content of $P_2O_5$ is 25% and the operation recovery rate of $P_2O_5$ is 30%. Nonmagnetic products are high-purity phosphate concentrate products. Hydrochloric acid was used and mixed with the magnetic products, an acid excess coefficient was controlled to be 3.0, a liquid-solid ratio L/S was controlled to be 2.0, temperature was controlled to be 90° C., 0.1% of polyacrylamide and gelatin mixture by mass percentage was added and used as flocculating agent, a mass ratio of polyacrylamide to gelatin is 2:1, the leaching time is 150 min, finally the leaching residues were obtained, the grade of REO in the leaching residues is 25%, the operation recovery rate thereof is 90%, water was added until a mass ratio of water to solid substances in ore pulp is 3:10, a water glass mixture was added and used as an inhibitor, sodium oleate was added and used as a collector, and a flotation process including one time of roughing, one time of scavenging and three times of cleaning was performed, wherein the dose of the water glass during roughing is 1500 g/t·raw ore, the dose of sodium oleate is 500 g/t·raw ore, the dose of the water glass and sodium oleate during scavenging is half of the dose during roughing, the three times of cleaning are blank cleaning, monazite concentrate with the grade of REO which is 55% can be obtained through flotation retreatment, then strong-intensity magnetic flotation was performed to the floated concentrate at magnetic field intensity of 8000 Oe, magnetic products, i.e., monazite concentrate with the grade of REO which is 60.25% can be obtained thereby, and the operation recovery rate thereof is 93%.

Embodiment 2

For certain monazite and apatite paragenetic ores originated from Australia, with content of REO and $P_2O_5$ in raw ores being respectively 3.5% and 12%, 500 g of raw ores were weighed and crushed and ground to 200-mesh ore particles accounting for 80% of the total particles, water was added until a mass ratio of water to solid substances in ore pulp is 9:20, a water glass mixture was added and used as an inhibitor, oxidized paraffin wax soap was added and used as a collector, and the flotation process including one time of roughing, one time of scavenging and three times of cleaning at normal temperature was performed, wherein the dose of the water glass during roughing is 2000 g/t·raw ore, the dose of oxidized paraffin wax soap is 400 g/t·raw ore, the dose of the agent was halved during one time of scavenging, the three times of cleaning are blank cleaning, floated mixed concentrate can be obtained thereby, the content of REO therein is 8%, the operation recovery rate of REO is 95%, the content of $P_2O_5$ is 32% and the operation recovery rate of $P_2O_5$ is 94%. The mixed concentrate was subjected to high-intensity magnetic separation at magnetic field intensity of 10000 Oe, magnetic products, i.e., monazite and apatite mixed concentrate can be obtained thereby, the content of REO therein is 12%, the operation recovery rate of REO is 92%, the content of $P_2O_5$ is 24% and the operation recovery rate of $P_2O_5$ is 32%. Nonmagnetic products are high-purity phosphate concentrate products. Mixture of hydrochloric acid and phosphoric acid with a volume ratio of 2:1 was used and mixed with the magnetic products, an acid excess coefficient was controlled to be 0.8, a liquid-solid ratio L/S was controlled to be 2.5, the temperature was controlled to be 75° C., 0.2% of polyacrylamide and gelatin mixture was added and used as flocculating agent, a mass ratio of polyacrylamide to gelatin is 2:1, the leaching time is 100 min, finally the leaching residues were obtained, the grade of REO in the leaching residues is 32%, the operation recovery rate thereof is 92%, water was added until a mass ratio of water to solid substances in ore pulp was 3:10, a water glass mixture was added and used as an inhibitor, oxidized paraffin wax soap was added and used as a collector, and the flotation process including one time of roughing, one time of scavenging and three times of cleaning was performed, wherein the dose of the water glass during roughing is 2000 g/t·raw ore, the dose of the collector is 200 g/t·raw ore, the dose of the inhibitor and the collector during scavenging is half of the dose during roughing, the three times of cleaning are blank cleaning, and monazite concentrate with the grade of REO which is 62% can be obtained through flotation retreatment.

Embodiment 3

For certain monazite and apatite paragenetic ores originated from Russia, with content of REO and $P_2O_5$ in raw ores being respectively 2.5% and 10%, 500 g of raw ores were weighed and crushed and ground to 200-mesh ore particles accounting for 90% of the total particles, water was added until a mass ratio of water to solid substances in ore pulp is 3:5, a water glass mixture was added according to a dose of 1000 g/t·raw ore and used as an inhibitor, oxidized paraffin wax soap and sodium oleate were mixed according to a mass ratio of 1:1 to obtain mixed agent which is used as a collector, and the flotation process including one time of roughing, one time of scavenging and three times of cleaning at normal temperature was performed, wherein the dose of the water glass during roughing is 1000 g/t·raw ore, the dose of the collector is 200 g/t·raw ore, the dose of the agent was halved during one time of scavenging, the three times of cleaning are blank cleaning, floated mixed concentrate can be obtained thereby, the content of REO therein is 6%, the operation recovery rate of REO is 88%, the content of $P_2O_5$ is 31.5% and the operation recovery rate of $P_2O_5$ is 92%. The mixed concentrate was subjected to strong-intensity magnetic separation at magnetic field intensity of 9000 Oe, magnetic products, i.e., monazite and apatite mixed concentrate can be obtained thereby, the content of REO therein is 13%, the operation recovery rate of REO is 88%, the content of $P_2O_5$ is 27% and the operation recovery rate of $P_2O_5$ is 24%. Nonmagnetic products are high-purity phosphate concentrate products. Phosphoric acid was used and mixed with the magnetic products, the acid excess coefficient was controlled to be 2.0, the liquid-solid ratio L/S was controlled to be 5.0, the temperature was controlled to be 70° C., 0.2% of polyacrylamide and gelatin mixture was added and used as flocculating agent, the mass ratio of polyacrylamide to gelatin is 2:1, the leaching time is 250 min, finally the leaching residues were obtained, the grade of REO in the leaching residues is 28%, the operation recovery rate thereof is 95%, water was added until a mass ratio of water to solid substances in ore pulp is 3:10, a water glass mixture was added and used as an inhibitor, a mixture of oxidized paraffin wax soap and sodium oleate with a mass ratio of 1:1 was added and used as a collector, and the flotation process including one time of roughing, one time of scavenging and three times of cleaning was performed, wherein the dose of the water glass during roughing is 500 g/t·raw ore, the dose of the collector is 250 g/t·raw ore, the dose of the inhibitor and the collector during scavenging is half of the dose during roughing, the three times of cleaning are blank cleaning, and monazite concentrate with the grade of REO which is 60% can be obtained through flotation retreatment.

Embodiment 4

For certain monazite and apatite paragenetic ores originated from South Africa, with content of REO and $P_2O_5$ in raw ores being respectively 7.25% and 10%, 500 g of raw ores were weighed and crushed and ground to 200-mesh ore particles accounting for 80% of the total particles, water was added until a mass ratio of water to solid substances in ore pulp is 1:2, a water glass mixture was added and used as an inhibitor, a mixture of oxidized paraffin wax soap and sodium oleate with a mass ratio of 1:1 was used as a collector, and the flotation process including one time of roughing, one time of scavenging and two times of cleaning at normal temperature was performed, wherein the dose of the water glass during roughing is 1500 g/t·raw ore, the dose of the collector is 500 g/t·raw ore, the dose of the agent is halved during one time of scavenging, the two times of cleaning are blank cleaning, floated mixed concentrate can be obtained thereby, the content of REO therein is 16%, the operation recovery rate of REO is 96%, the content of $P_2O_5$ is 30% and the operation recovery rate of $P_2O_5$ is 93%. The mixed concentrate was subjected to high-intensity magnetic separation at magnetic field intensity of 8000 Oe, magnetic products, i.e., monazite and apatite mixed concentrate can be obtained thereby, the content of REO therein is 17%, the operation recovery rate of REO is 93%, the content of $P_2O_5$ is 26% and the operation recovery rate of $P_2O_5$ is 90%. Nonmagnetic products are high-purity phosphate concentrate products. Diluted acid was used and mixed with the magnetic products, the acid excess coefficient was controlled to be 0.5, the liquid-solid ratio L/S was controlled to be 2.2, the temperature was controlled to be 120° C., 0.3% of polyacrylamide and gelatin mixture was added and used as a flocculating agent, the mass ratio of polyacrylamide to gelatin is 2:1, the leaching time is 50 min, finally the leaching residues were obtained, the grade of REO in the leaching residues is 38%, the operation recovery rate thereof is 95%, water was added until the mass ratio of water to solid substances in ore pulp is 4:10, a water glass mixture was added and used as an inhibitor, mixture of oxidized paraffin wax soap and sodium oleate with a mass ratio of 1:1 was added and used as a collector, and the flotation process including one time of roughing, one time of scavenging and two times of cleaning was performed, wherein the dose of the water glass during roughing is 1000 g/t·raw ore, the dose of the collector is 200 g/t·raw ore, the dose of the inhibitor and the collector during scavenging is half of the dose during roughing, the two times of cleaning are blank cleaning, monazite concentrate with the grade of REO which is 65% can be obtained through flotation retreatment, and the operation recovery rate thereof is 92%.

Embodiment 5

For certain monazite and apatite paragenetic ores originated from Greece, with content of REO and $P_2O_5$ in raw ores being respectively 1.08% and 17%, 500 g of raw ores were weighed and crushed and ground to 200-mesh ore particles accounting for 65% of the total particles, water was added until a mass ratio of water to solid substances in ore pulp is 11:20, a water glass mixture was added and used as an inhibitor, a mixture of oxidized paraffin wax soap and oleic acid with a mass ratio of 1:1 was used as collector, and the flotation process including one time of roughing, one time of scavenging and three times of cleaning at normal temperature was performed, wherein the dose of the water glass during roughing is 500 g/t·raw ore, the dose of the collector is 500 g/t·raw ore, the dose of the agent was halved during one time of scavenging, the three times of cleaning are blank cleaning, the floated mixed concentrate can be obtained thereby, the content of REO therein is 10%, the operation recovery rate of REO is 95%, the content of $P_2O_5$ is 32% and the operation recovery rate of $P_2O_5$ is 93%. The mixed concentrate was subjected to high-intensity magnetic separation at magnetic field intensity of 12000 Oe, magnetic products, i.e., monazite and apatite mixed concentrate can be obtained thereby, the content of REO therein is 16%, the operation recovery rate of REO is 98%, the content of $P_2O_5$ is 23% and the operation recovery rate of $P_2O_5$ is 30%. Nonmagnetic products are high-purity phosphate concentrate products. Diluted acid was used and mixed with the magnetic products, the acid excess coefficient was controlled to be 2.0, the liquid-solid ratio L/S was controlled to be 2.2, the temperature was controlled to be 20° C., 0.1% of polyacrylamide by mass percentage was added and used as a flocculating agent, the leaching time is 300 min, finally the leaching residues were obtained, the grade of REO in the leaching residues is 38%, the operation recovery rate thereof is 95%, water was added until a mass ratio of water to solid substances in ore pulp is 4:10, a water glass mixture was added and used as an inhibitor, a mixture of oxidized paraffin wax soap and oleic acid with a mass ratio of 1:1 was added and used as collector, and the flotation process including one time of roughing, one time of scavenging and five times of cleaning was performed, wherein the dose of the water glass during roughing is 2000 g/t·raw ore, the dose of the collector is 200 g/t·raw ore, the dose of the inhibitor and the collector during scavenging is half of the dose during roughing, the three times of cleaning are blank cleaning, monazite concentrate with the grade of REO which is 55% can be obtained through flotation retreatment, and the operation recovery rate thereof is 95%; and then high-intensity magnetic separation was performed to the floated concentrate at magnetic field intensity of 12000 Oe, magnetic products, i.e., monazite concentrate with the grade of REO which is 59% can be obtained thereby, and the operation recovery rate thereof is 93%.

Embodiment 6

For certain monazite and apatite paragenetic ores in Europe, with content of REO and $P_2O_5$ in raw ores being respectively 0.56% and 17%, 500 g of raw ores were weighed and crushed and ground to 200-mesh ore particles accounting for 75% of the total particles, water was added until a mass ratio of water to solid substances in ore pulp is 10:20, a water glass mixture was added and used as an inhibitor, a mixture of oxidized paraffin wax soap and oleic acid with a mass ratio of 1:1 was used as a collector, and the flotation process including one time of roughing and three times of cleaning at normal temperature was performed, wherein the dose of the water glass during roughing is 500 g/t·raw ore, the dose of the collector is 600 g/t·raw ore, the three times of cleaning are blank cleaning, floated mixed concentrate can be obtained thereby, the content of REO therein is 8%, the operation recovery rate of REO is 93%, the content of $P_2O_5$ is 27% and the operation recovery rate of $P_2O_5$ is 95%. The mixed concentrate was subjected to high-intensity magnetic separation at magnetic field intensity of 11000 Oe, magnetic products, i.e., monazite and apatite mixed concentrate can be obtained thereby, the content of REO therein is 15%, the operation recovery rate of REO is 98%, the content of $P_2O_5$ is 20% and the operation recovery rate of $P_2O_5$ is 28%. Nonmagnetic products are high-purity phosphate concentrate products. Diluted acid was used and mixed with the magnetic products, the acid excess coefficient was controlled to be 2.0, the liquid-solid ratio L/S was controlled to be 2.0, the temperature was controlled to be 50° C., 0.2% of polyacrylamide by mass percentage was added and used as a flocculating agent, the leaching time is 200 min, finally the leaching residues were obtained, the grade of REO in the leaching residues is 35%, the operation recovery rate thereof is 92%, water was added until a mass ratio of water to solid substances in ore pulp is 6:10, a water glass mixture was added and used as an inhibitor, a mixture of oxidized paraffin wax soap and oleic acid with a mass ratio of 1:1 was added and used as a collector, and the flotation process including one time of roughing and two times of cleaning was performed, wherein the dose of the water glass during roughing is 1000 g/t·raw ore, the dose of the collector is 250 g/t·raw ore, the dose of the inhibitor and the collector during scavenging is half of the dose during roughing, the two times of cleaning are blank cleaning, monazite concentrate with the grade of REO which is 56% can be obtained through flotation retreatment, and the operation recovery rate thereof is 92%; and then high-intensity magnetic separation was performed to the floated concentrate at magnetic field intensity of 11000 Oe, magnetic products, i.e., monazite concentrate with the grade of REO which is 61% can be obtained thereby, and the operation recovery rate thereof is 94%.

The invention claimed is:

1. A monazite and apatite paragenetic ore enrichment method, comprising the following steps: performing acid leaching of mixed concentrate containing rare earth and apatite with inorganic acid and then performing liquid-solid separation to obtain acid leaching residues and leaching solution, wherein the acid leaching residues are monazite and apatite paragenetic ores; and a liquid-solid ratio of the inorganic acid to the mixed concentrate is 2.0-5.0, an acid excess coefficient is 0.2-3.0, and 0.1-0.3% of flocculating agent by mass percentage based on a mass sum of the mixed concentrate and the inorganic acid is added during the acid leaching, and liquid temperature of a leaching system during the acid leaching is 20-120° C.

2. The monazite and apatite paragenetic ore enrichment method according to claim 1, characterized in that the mixed concentrate is a solid matter obtained by performing ore grinding to raw ores, then performing pulp mixing and performing primary flotation and/or magnetic separation, the content of REO in the raw ores of the monazite and apatite paragenetic ores is 0.3-10% by mass.

3. The monazite and apatite paragenetic ore enrichment method according to claim 1, characterized in that the inorganic acid is one of HCl, HBr, HI, $HNO_3$ and $H_3PO_4$.

4. The monazite and apatite paragenetic ore enrichment method according to claim 1, characterized in that the inorganic acid is HCl and/or $H_3PO_4$, and a volume ratio of HCl to $H_3PO_4$ is 2:1 when the inorganic acid is mixture of HCl and $H_3PO_4$.

5. The monazite and apatite paragenetic ore enrichment method according to claim 1, characterized in that the flocculating agent is polyacrylamide and/or gelatin.

6. The monazite and apatite paragenetic ore enrichment method according to claim 1, characterized in that the flocculating agent is polyacrylamide and gelatin, and a mass ratio of the polyacrylamide to the gelatin is 2:1.

7. The monazite and apatite paragenetic ore enrichment method according to claim 2, characterized in that a mass ratio of water to solid substances in ore pulp is (2-3):5 during the primary flotation.

8. The monazite and apatite paragenetic ore enrichment method according to claim 2, characterized in that magnetic field intensity during the magnetic separation is 8000-12000 Oe.

9. The monazite and apatite paragenetic ore enrichment method according to claim 7, characterized in that the ore pulp is obtained during the primary flotation by a method which comprises the following steps: grinding the raw ores into ones wherein the weight of particles with a particle size of <0.074 mm is not lower than 60% of total weight of the raw ores, and adding water for pulp mixing.

10. The monazite and apatite paragenetic ore enrichment method according to claim 7, characterized in that the primary flotation comprises primary roughing and primary cleaning.

11. The monazite and apatite paragenetic ore enrichment method according to claim 10, characterized in that the primary roughing is flotation by adding flotation agent I into the ore pulp, the flotation agent I comprises an inhibitor and a collector, and the collector is at least one of sodium aliphatate and oxidized paraffin wax soap.

12. The monazite and apatite paragenetic ore enrichment method according to claim 11, characterized in that a dose of the collector in the flotation agent I is 200-500 g/t raw ore.

13. The monazite and apatite paragenetic ore enrichment method according to claim 11, characterized in that the inhibitor in the flotation agent I is water-soluble silicate or water-soluble fluosilicate.

14. The monazite and apatite paragenetic ore enrichment method according to claim 10, characterized in that the primary cleaning is blank cleaning without adding any agent.

15. The monazite and apatite paragenetic ore enrichment method according to claim 11, characterized in that a dose of the inhibitor in the flotation agent I is 500-2000 g/t raw ore.

16. The monazite and apatite paragenetic ore enrichment method according to claim 10, characterized in that the primary flotation further comprises scavenging, a collector used for the scavenging is at least one of sodium aliphatate and oxidized paraffin wax soap, and a dose of the collector is 100-250 g/t·raw ore; and an inhibitor is water-soluble silicate or water-soluble fluosilicate, and a dose of the inhibitor is 250-1000 g/t·raw ore.

17. The monazite and apatite paragenetic ore enrichment method according to claim 11, characterized in that the collector in the flotation agent I is at least one of sodium oleate, saturated sodium aliphatate, sodium dodecyl sulfate and oxidized paraffin wax soap.

18. The monazite and apatite paragenetic ore enrichment method according to claim 11, characterized in that the collector in the flotation agent I is sodium oleate.

19. The monazite and apatite paragenetic ore enrichment method according to claim 16, characterized in that the collector used during scavenging is at least one of sodium oleate, saturated sodium aliphatate, sodium dodecyl sulfate and oxidized paraffin wax soap.

20. The monazite and apatite paragenetic ore enrichment method according to claim 16, characterized in that the collector used during scavenging is sodium oleate.

21. The monazite and apatite paragenetic ore enrichment method according to claim 20, characterized in that, after the acid leaching, the acid leaching residues are taken and added with water for pulp mixing and flotation agent II is added for secondary flotation to obtain monazite concentrate.

22. The monazite and apatite paragenetic ore enrichment method according claim 21, characterized in that the flotation agent II comprises an inhibitor and a collector, and the collector is at least one of sodium aliphatate and oxidized paraffin wax soap.

23. The monazite and apatite paragenetic ore enrichment method according to claim 22, characterized in that the secondary flotation comprises secondary roughing and secondary cleaning; and during the secondary flotation, a mass ratio of water to solid substances in the ore pulp is (3-6):10.

24. The monazite and apatite paragenetic ore enrichment method according to claim 23, characterized in that the flotation agent II is added during the secondary roughing, the flotation agent II comprises an inhibitor and a collector, and the collector is at least one of sodium aliphatate and oxidized paraffin wax soap.

25. The monazite and apatite paragenetic ore enrichment method according to claim 24, characterized in that a dose of the collector in the flotation agent II is 200-500 g/t·raw ore; and the collector in the flotation agent II is at least one of sodium oleate, saturated sodium aliphatate, sodium dodecyl sulfate and oxidized paraffin wax soap.

26. The monazite and apatite paragenetic ore enrichment method according to claim 24, characterized in that the inhibitor in the flotation agent II is water-soluble silicate or water-soluble fluosilicate.

27. The monazite and apatite paragenetic ore enrichment method according to claim 24, characterized in that the inhibitor in the flotation agent II is water glass, sodium silicate and/or sodium fluosilicate, and a dose thereof is 500-2000 g/t·raw ore.

28. The monazite and apatite paragenetic ore enrichment method according to claim 23, characterized in that the secondary flotation further comprises at least one time of scavenging, a collector used for the scavenging is at least one of sodium aliphatate and oxidized paraffin wax soap, and a dose of the collector is 100-250 g/t·raw ore; and an inhibitor used for the scavenging is water-soluble silicate or water-soluble fluosilicate, and a dose of the inhibitor is 250-1000 g/t·raw ore.

29. The monazite and apatite paragenetic ore enrichment method according to claim 23, characterized in that the secondary cleaning is blank cleaning without adding any agent and the blank cleaning is conducted 2-5 times.

30. The monazite and apatite paragenetic ore enrichment method according to claim 21, characterized in that magnetic separation is performed to the obtained monazite concentrate after the secondary flotation and magnetic field intensity during the magnetic separation is 8000-12000 Oe.

31. The monazite and apatite paragenetic ore enrichment method according to claim 30, characterized in that the liquid temperature of a leaching system during the acid leaching is 40-100° C. and time of acid leaching treatment is 50-300 min.

32. The monazite and apatite paragenetic ore enrichment method according to claim 31, characterized in that the acid excess coefficient during the acid leaching is 0.2-2.0.

* * * * *